United States Patent [19]
Cholid et al.

[11] Patent Number: 5,062,733
[45] Date of Patent: Nov. 5, 1991

[54] JOINING ELEMENT FOR BEAMS

[75] Inventors: Yanbo Cholid, Bremen, Fed. Rep. of Germany; Trygve Theordorsen, Jar, Norway; Jurgen Wilhelmi, Syke - Wachendorf, Fed. Rep. of Germany

[73] Assignee: Bulldog Beratungs-und Vertriebs-GmbH, Syke, Fed. Rep. of Germany

[21] Appl. No.: 517,680

[22] Filed: May 3, 1990

[30] Foreign Application Priority Data

May 3, 1989 [DE] Fed. Rep. of Germany ....... 3914618

[51] Int. Cl.$^5$ ............................................... F16B 7/08
[52] U.S. Cl. .................................... 403/189; 403/246; 403/382; 5/292
[58] Field of Search ............... 403/199, 246, 245, 230, 403/189, 187, 403, 382, 232.1; 52/702; 5/292, 294, 299, 304

[56] References Cited

U.S. PATENT DOCUMENTS

| 1,771,856 | 7/1930 | McCullough | 403/230 |
| 1,842,786 | 1/1932 | Kirsch | 5/294 X |
| 1,875,805 | 9/1932 | Dickson | 5/294 |
| 4,558,968 | 12/1985 | Meickl | 5/304 X |

FOREIGN PATENT DOCUMENTS 819146 10/1951 Fed. Rep. of Germany ...... 403/189

Primary Examiner—Andrew V. Kundrat
Attorney, Agent, or Firm—Wegner, Cantor, Mueller & Player

[57] ABSTRACT

The invention concerns a joining element made of metal, to connect the end face of a first beam to a second beam running crosswise to this first beam, or to another structural component, wherein the first beam's end section, which is to be connected to the second beam, is provided with an essentially centered vertical slot running in the longitudinal direction of the first beam from its end face that is to be connected, and with several drill holes in each of which a rod-shaped fastening means extending essentially across the width of the first beam, such as a dowel pin or the like, is disposed or is to be disposed, with at least one connecting flange protruding from the connecting surface of the second beam in the longitudinal of the first beam and to be attached to the second beam with a holding flange, the dimensions of which connecting flange essentially match the corresponding dimensions of the slot, and which connecting flange is provided with receiving openings each of which is able to accept one rod-shaped fastening means disposed in the first beam; in which invention at least one first receiving opening is dimensioned larger, at least in the longitudinal direction of the first beam, than the cross-section, extending in this direction, of the rod-shaped fastening means to be disposed in this first receiving opening, by so much that this fastening means is not engaged, either during or after assembly or when the first beam is put under load, wich at least one side wall of the first receiving opening running crosswise to the side wall of the first receiving opening that supports the rod-shaped fastening means.

17 Claims, 4 Drawing Sheets

JOINING ELEMENT FOR BEAMS

The invention concerns a joining element made of metal to connect the end face of a first (preferably wood) beam (typically, but not necessarily, one that runs horizontally), which may, for example, also be an inclined rafter, to a second (preferably wood) beam running crosswise to this first beam, wherein the first beam's end section, which is to be connected to the second beam, is provided on the one hand with an essentially centered vertical slot running in the longitudinal direction of the first beam from its end face that is to be connected, and on the other hand with several drill holes disposed crosswise to and in the vicinity of the slot, in each of which a rod-shaped fastening means extending essentially across the width of the first beam, such as a dowel pin or the like, is disposed or is to be disposed, with at least one connecting flange protruding, in the assembled state, from the connecting surface of the second beam in the longitudinal direction of the first beam and to be attached to the second beam with a holding flange, the dimensions of which connecting flange in regard to thickness, height and maximum length essentially match the corresponding dimensions of the slot, and which connecting flange is provided with receiving openings each of which is designed to accept one rod-shaped fastening means disposed in the first beam.

To join a first beam to a second beam running at a right angle to it (which may likewise be a girder, or also a support column which in general runs vertically), in addition to two-piece articulated joining elements which are relatively expensive, one-piece joining elements are also known, which are also called a "T-plate" in practice. These one-piece joining elements are essentially gusset plates, which are in widespread use particularly, but by no means exclusively, in carpentry for the purpose of joining beams (generally made of wood) to cross-girders or support columns. It is also possible, however, to connect a (first) beam directly to the structural member or to some other structural element. If accordingly a "second beam" is discussed herein, this only describes the principal case of application, without for example restricting the use of the joining element under the invention to that case.

When one-piece joining elements of this type are used, in each event (unlike the case with corresponding articulated joints of the type of the well-known hooked plate joint or the like) a joint results between the first beam that is to be connected and the second beam (or the structure itself) that essentially resists bending. The consequence of this is that because of the tolerances that are regularly present, undesirable additional stresses develop during assembly which persist beyond the assembly process and are overlaid on the stresses that result for the planned loads. Thus highly undesirable damage frequently occurs, particularly in the zone where the rod-shaped fastening means generally configured as dowel pins are inserted, but as the case may be, excessive compressions or the like also occur at the end face of the first beam and/or the connecting side of the second beam or the like. In addition, for the one known joining element of this class, the connecting flange of which is provided with several drill holes matching the diameter of the dowel pins or the like to be inserted, and the holding flange of which runs at a right angle to the connecting flange, difficulties often arise during the assembly process despite the use of drilling templates or the like, especially because the first beam that is to be connected must not only be appropriately aligned when the dowel pins or the like are inserted, but at the same time must also be held at least long enough for the first dowel pin to be driven in.

The present invention accordingly has the objective of improving the joining elements of this class, while avoiding their drawbacks, particularly so that while assembly is considerably easier, stresses induced by the assembly process do not occur or at least occur only to a considerably lesser extent, while in addition even in the assembled, built-in state, a seating of the rod-shaped fastening means in a manner appropriate to its function is achieved in the connecting flange of the joining element (including in relation to the first beam that is to be connected), and at least with regard to one rod-shaped joining element or its (first) receiving opening, a stress limited to transverse forces (generated by loads on the first beam) can be achieved, i.e., so to speak, a "splitting-up" of the imposed functional-induced loads or stresses is to be made possible. This objective is accomplished under the invention in that at least one first receiving opening of the connecting flange of the joining element is dimensioned larger, at least in the longitudinal direction of the first beam that is to be connected, than the cross-section, extending in this direction, of the rod-shaped fastening means to be disposed in this first receiving opening, by so much that this fastening means is not engaged, either during or after assembly or when the first beam is put under load, with at least one side wall of the first receiving opening running crosswise to the side wall supporting the rod-shaped fastening means, i.e., when a cylindrical dowel pin or the like is used as the rod-shaped fastening means, the dimensioning of the first receiving opening in its receiving zone is larger than the diameter of the dowel pin in question by so much that in the assembled state there occur neither avoidable stresses from assembly, nor stresses other than those deriving from the designed transverse-force stresses due to (weight) loads. This goal is generally accomplished with certainty, particularly with the nominal diameters of 12, 14, 16, or 18 mm common in carpentry, taking the usual tolerances into account, if the distance between a rod-shaped fastening means disposed in a first receiving opening and a side-wall section of the first receiving opening, specified as contact-free, is at least about 2 mm in the assembled state of the first beam.

In a preferred embodiment of the present invention, the (at least one) first receiving opening is so configured and dimensioned that in the assembled state the rod-shaped fastening means it accepts is engaged only on its underside with the lower side wall of the first receiving opening, while the side zones of the dowel pin or the like on both sides oriented in the longitudinal direction of the first beam, and the top side of the dowel pin lying opposite its engaged zone, are free, so that particularly during and after assembly, but also—depending on the dimension the receiving opening—where applicable also under load, this dowel pin is subjected only to the transverse forces deriving from the load.

A variant of the embodiment described above consists in that the (at least one) first receiving opening is so configured and dimensioned that in the assembled state the rod-shaped fastening means it accepts is additionally engaged—aside from with the lower side wall—with a side-wall section of the first receiving opening in the direction of the first beam's end face that is to be connected; i.e., the dowel pin is additionally seated against the section of its support zone facing toward the first beam's end face that is to be connected, in the connecting flange or in its first receiving opening.

Regardless of whether one or the other of the two possible embodiments above is selected, to avoid unnecessary forcing when the first beam is put under load, it may be useful if the bearing surface of the (at least one) first receiving opening for a dowel pin or the like, which surface runs crosswise to the vertical, is configured to be curved essentially in the shape of the deflection curve of the first beam as results under load in the assembled state, so that the dowel pin or the like in question, intended only to receive transverse forces, is essentially movable without constraint in the first receiving opening when the first beam is under load. Here a definition of the shape of the supporting surface of the first receiving opening, i.e., the curvature to be chosen for it, is readily possible according to the laws of statics, given a knowledge of the dimensions of the first wood beam on the one hand and the load to which it is subjected in the service state on the other hand, in which context it has furthermore been found that such a configuration is possible even without a specific knowledge of the deflection curve in the individual case, if one uses as a basis a mean value for the possible deflection curves, especially since the deflection curves of beams that would come in question do not deviate greatly from one another.

In particular, to simplify assembly in comparison to known joining elements of this class (without at the same time significantly influencing the status strength characteristics in a negative manner), the configuration may preferably be chosen in such a way that a recess extends upward from the (at least one) first receiving opening, having a width at least as great as the largest cross-section of the dowel pin or the like in question measured in the longitudinal direction of the first beam, so that this dowel pin is guided from above into the first receiving opening in question, and can be lowered down into its supported position.

Although it is in no way obligatory for this recess, configured in the manner of an "upward extension of the first receiving opening," to extend as far as the upper edge of the connection flange, such a configuration is particularly useful because it not only opens up the possibility of first driving in the dowel pin or the like in question apart from its final assembly position and only then moving it into the assembly position, but furthermore obviously opens up the possibility of beforehand driving in the dowel pin or the like in question into the first beam in question, and then hanging it in from above into the receiving flange or the first receiving opening in question, thus resulting in considerably simpler and accordingly considerably faster assembly, especially since the beam to be connected here is to be supported on the connecting flange even before its connecting end has reached the assembly position.

It may be highly useful, and not with the aforementioned configuration alone, if the wall section of the (at least one) first receiving opening facing away from the first beams' end face, which is to be connected, is configured so as to be angled off or curved at least on its upper end section, and accordingly is widened relative to the recess section immediately adjoining this angled-off or curved upper section since the dowel pin in question then can so to speak be received supported by way of a ramp and moved in a guided manner into its assembled position supported by the first receiving opening.

In particular in the preferred configuration first described above, in which the dowel pin or the like is only engaged on its underside with the side wall of the first receiving opening that supports it, and is free laterally, it is highly useful if at a distance from the first receiving opening(s) at least one second receiving opening is present in the connecting flange of the joining element, presenting a cross-section matching the cross-section of the dowel pin or the like to be disposed in this second receiving opening. Where the first or the second receiving opening is consequently configured, in the case of a cylindrical dowel pin or the like, as a drill hole the diameter of which matches the diameter of the dowel pin, so that by means of this dowel pin or the second receiving opening that functions in association with it, the fastening of the first beam relative to the second beam or the like, as specified in the design, is possible.

Here, in accordance with more recent pertinent regulations, it may be sufficient if a joining element under the invention only presents one first receiving opening and one second receiving opening. Nevertheless, of course, more than two receiving openings may be present if the static circumstances so require, in which case a preferred embodiment consists in that two (or more) first receiving openings are provided, which then in general are usefully disposed offset from one another in the longitudinal direction of the first beam, as well as a second receiving opening, as will be still further clarified below using exemplary embodiments with reference to the drawing.

In joining elements having this configuration in particular, in which first receiving openings are each provided with a recess extending to the upper edge of the connecting flange, preferably the section of the connection flange lying between two mutually adjacent receiving openings, or between the free edge of the connecting flange and the first receiving opening adjacent to this edge, has a recess below the upper (imaginary) edge line of the connecting flange, or it ends below the upper (imaginary) edge line.

It should furthermore be pointed out that the holding flange configured, in a manner that is known per se, in a single piece with the connecting flange by no means necessarily has to run at a right angle to the connecting flange, but may also be configured flush with the connecting flange. This is particularly advantageous and accordingly useful when the holding flange extends through the second beam and presents on its end facing away from the connecting flange a second connecting flange to connect a third beam flush with the second beam, in which case this second connecting flange may then be configured mirror-symmetric with the first connecting flange.

The invention is further explained below using exemplary embodiments, with reference to a drawing.

FIGS. 1 to 3 show a joining element, designated as a whole by 1, made of metal, to connect the end face of a horizontally running first (wood) beam 2, used as a girder, to a second (wood) beam 3 running crosswise to the first beam (and likewise horizontally), which thus is likewise used as a girder.

Figure 2:
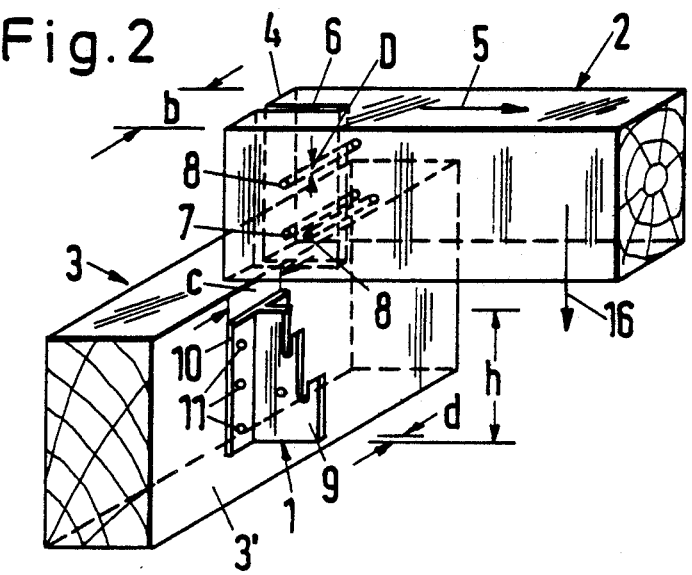
FIG. 2 shows the joining element as in FIG. 1 (reduced and in perspective) attached to a girder so as to connect a first beam disposed above that girder, before assembly.

The first beam's (2) end section, which is to be connected to the second beam 3, is provided with a centered vertical slot 6 running from its end face 4 that is to be connected (see FIG. 2), in the longitudinal direction 5 of the first beam 2, as well as with three drill holes 7 disposed crosswise to the slot 6 and in its vicinity, each of which serves to accept a rod-shaped fastening means of the type of a dowel pin 8, extending essentially across the width b of the first beam 2, where two of these dowel pins 8 have already been disposed in the first beam 2 before assembly (see FIG. 2), while the third dowel pin 8 is only put in place after the remaining assembly is performed (see assembled state as in FIG. 3), as is explained in further detail below.

The joining element 1 presents a connecting flange 9 protruding in the assembled state (see FIG. 3) from the connecting surface 3' of the second beam 3 in the longitudinal direction 5 of the first beam 2, which flange is joined or configured integrally with a holding flange 10 running at a right angle to it and to be fastened in the second beam 3, and is to be joined to the second beam 3 by fasteners (not shown) such as, in particular, nails or screws. For this purpose, the legs of the holding flange 10 protruding free on both sides of the connecting flange 9 present drill holes 11 in a manner known per se, which are shown only in FIG. 2, indicated by their center lines 21 in FIG. 1, and otherwise left out of the drawing for the sake of better comprehensibility and greater simplicity.

The dimensions of the connecting flange 9 essentially correspond, as regards its thickness d, its maximum height h and its maximum length k, to the corresponding dimensions of the slot 6, so that during assembly it can be inserted therein; to avoid a gap between the end face 4 of the first beam 2 and the connecting surface 3' of the second beam 3, the holding flange 10 may be set into the side of the second beam 3 presenting the connecting surface 3', by means of appropriate milling-out or the like, but in general will sit against the connecting surface 3' as shown in FIG. 2 of the drawing, so as to avoid the corresponding working expense and in particular so as not to weaken the cross-section of the second beam 3 at the connection point. If a completely covered connection with such a joining element 1 is intended, obviously the end face 4 of the first beam 2 might be provided with a corresponding milled-out recess the same size as the width c of the holding flange, which is obviously considerably simpler regarding production technique and of considerably less effect on strength.

For the actual acceptance of the first beam 2 on the second beam 3, the connecting flange 9 of the fastening means 1—in accordance with the number of drill holes 7 in the first beam 2—is provided with three receiving openings 12, each for the acceptance of a dowel pin 8, as will be described in detail below with particular reference to FIG. 1.

Figure 1:
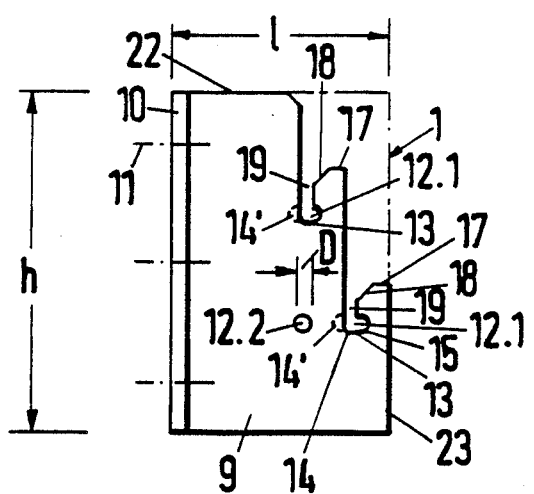
FIG. 1 shows a first exemplary embodiment of a joining element of the invention in a side view, looking at the left side surface of the connecting flange.

As can be seen from FIG. 1, the connecting flange 9 of the joining element 1 presents two first receiving openings 12.1 and one second receiving opening 12.2, all of which are disposed a certain distance apart from one another.

It can be seen that each of the first receiving openings 12.1 is made of a dimension larger in the longitudinal direction 5 of the first beam 2 than the cross-section, extending in the longitudinal direction 5 of the first beam 2, of the dowel pin 8 to be disposed in each of the first receiving openings 12.1—i.e., in the present case, the diameter D of a dowel pin 8—while the second receiving opening 12.2 presents a diameter and thus the cross-section of the dowel pin 8 to be disposed in the second receiving opening 12.2.

Here the first receiving openings 12.1 are made of such dimensions that, in the assembled state, the dowel pin 8 accepted by each of them lies only on its underside against the lower side wall 13 of the first receiving opening 12.1 supporting it. Only its section facing toward the end face 4 of first beam 2 lies against the side wall 14 of the first receiving opening 12.1, at the left in FIG. 1. The opposing right side wall 15 of the first receiving opening 12.1 in each case is not in contact with the dowel pin 8, so that during assembly and (with use of the appropriate dimensions), even in the loaded state, no constraints with corresponding stresses can arise there. Thus the corresponding dowel pins 8 can receive only (at least for the most part) transverse forces.

To ensure this, the left side wall section 14 associated in the assembled state with each dowel pin 8 may likewise have a recess (like the opposite right side wall section 15), as shown by dotted lines in FIG. 1 and designated by 14'. In such a configuration, in the assembled state the dowel pin 8 thus lies with only its lower side on the lower side wall 13 of the respective first receiving opening 12.1, and is free on both sides in the longitudinal direction 5, so that with certainty it can receive only transverse forces both during assembly and under subsequent loading, and no overlapping stresses above and beyond the specified loads can develop during assembly.

After the joining element 1 is fastened to the second beam 3 as can be seen in FIG. 2, the first beam 2 that is to be connected is hung in from above as in FIG. 2, in the direction of the arrow 16; the upper dowel pin 8 and the right dowel pin 8 have already been driven in, so that during assembly the first beam 2 can immediately be supported on the connecting flange 9 of the joining element 1, without one's having to hold it during assembly, as is the case with known joining elements of this class, and thus assembly is already simplified quite considerably to this extent. Here each of the two aforementioned dowel pins 8 may first be supported on a horizontal support surface 17 of the connecting flange 9, and then slip down a ramp 18 into a slot-shaped recess 19, the width of which matches the diameter D of a dowel pin 8, so that during assembly each of the recesses 19 serves as a guide to lead the dowel pin 8 in question into the receiving opening 12.1 proper.

Figure 3:
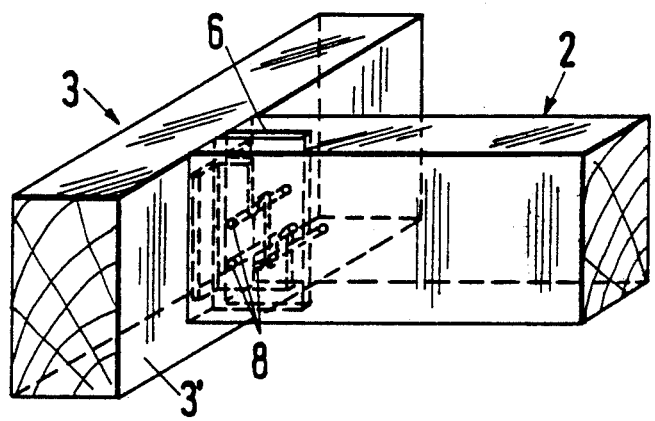
FIG. 3 shows the disposition as in FIG. 2 in the assembled position.

As has already been indicated, the precise final positioning then takes place by means of the second receiving opening 12.2, into which the third dowel pin 8 is then driven after the described preliminary assembly procedure, so that ultimately the assembled state shown in FIG. 3 results.

Figure 5:
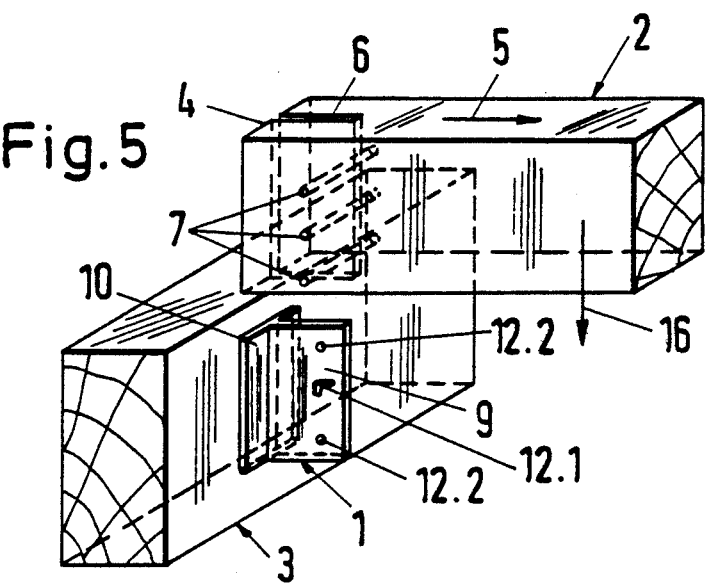
FIG. 5 shows the use of the joining element as in FIG. 4 for an application case as in FIGS. 2 and 3, illustrated as in FIG. 2.
Figure 6:
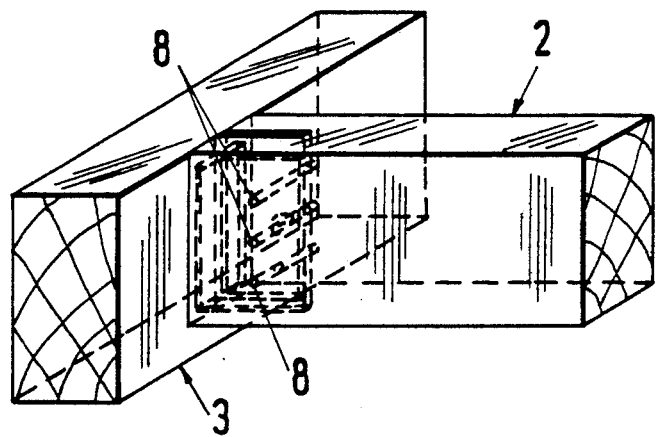
FIG. 6 shows the assembled state of the disposition as in FIG. 5, illustrated as in FIG. 3.
Figure 4:
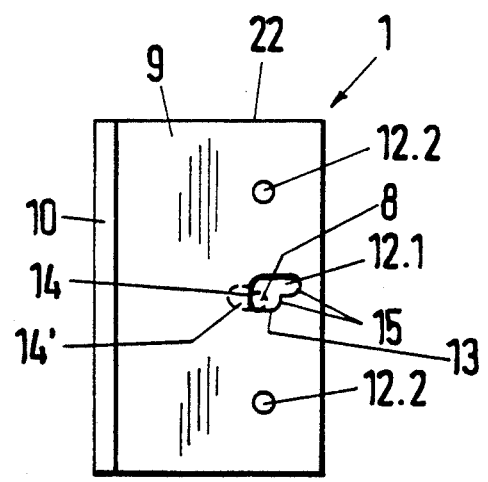
FIG. 4 shows a second exemplary embodiment of a joining element of the invention, illustrated as in FIG. 1.

FIGS. 4 to 6 show a variant of the joining element 1, in which the same parts or parts having the same function—as in the other figures as well—are provided with the same reference symbols as in FIGS. 1 to 3.

As can be seen in particular from FIG. 4, the joining element 1 of FIGS. 4 to 6 presents only one first receiving opening 12.1 and two second receiving openings 12.2, while the first receiving opening 12.1 is not open toward the outer edge of the connecting flange 9 by way of a recess 19, as is the case in the joining element 1 per FIGS. 1 to 3, so that although the first beam 2 that is to be connected is already provided with three drill holes 7 before assembly, no dowel pins 8 have been driven into these holes as yet, so that the first beam 2 cannot immediately be supported in an advantageous manner on the connecting flange 9 of the joining element 1 during assembly, but instead must be held, as is the case with known joining elements of this class.

Nevertheless, even this configuration, not as advantageous functionally as the configuration of FIGS. 1 to 3 but more economical to produce, presents the advantage over previously known joining elements of this class in that the dowel pin 8 to be driven into the first receiving opening 12.1, as indicated in FIG. 4, just like the dowel pins 8 disposed in the first receiving openings 12.1 in the configuration per FIGS. 1 to 3, can essentially receive only transverse forces, particularly if the left side wall 14 in the assembled state does not lie against the dowel pin 8, but instead has a recess to the left along the dotted line 14', so that the dowel pin 8 then again lies only with its lower side on the lower side wall 13 of the first receiving opening 12.1.

Assembly is also easier with this simpler configuration than under the state of the art, since because of the dimension of the first receiving opening 12.1 the dowel pin 8 associated with the first receiving opening 12.1 can be driven in considerably more easily than with known joining elements, which only present receiving openings that correspond to the second receiving openings, so that the desired support state during assembly can be achieved considerably more easily and faster than with comparable known joining elements.

Once the dowel pin has been driven in and passes through the first receiving opening 12.1, then due to the weight of the first beam 2 that is to be connected, the dowel comes to engage on its own with the lower side wall 13 of the first receiving opening 12.1, whereupon the first beam 2 then can relatively easily be aligned relative to the second beam 3 in such a way that the remaining two drill holes 7 are flush with the two second receiving openings 12.2 and the corresponding dowel pins 8 can then be driven in.

As will be readily apparent to those skilled in the art, the joining element 1 of FIGS. 4 to 6 can also be modified at a reasonable added expense in such a way that—as in joining element 1 per FIGS. 1 to 3—there are two first receiving openings 12.1 and only one second receiving opening 12.2. With such a configuration, then, essentially the same effects will thus be provided in the assembled state as with joining element 1 of FIGS. 1 to 3, although assembly—as explained—will be significantly more difficult than with the configuration per FIGS. 1 to 3 (yet at the same time—as likewise explained—still considerably simpler than under the state of the art).

Figure 8:
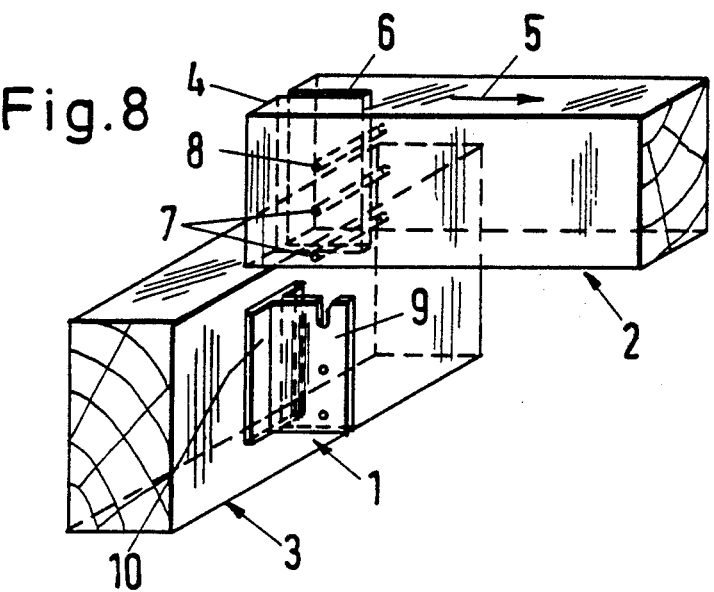
FIG. 8 shows a use of the joining element as in FIG. 7 for an application case as in FIGS. 2 and 3, illustrated as in FIG. 2.
Figure 9:
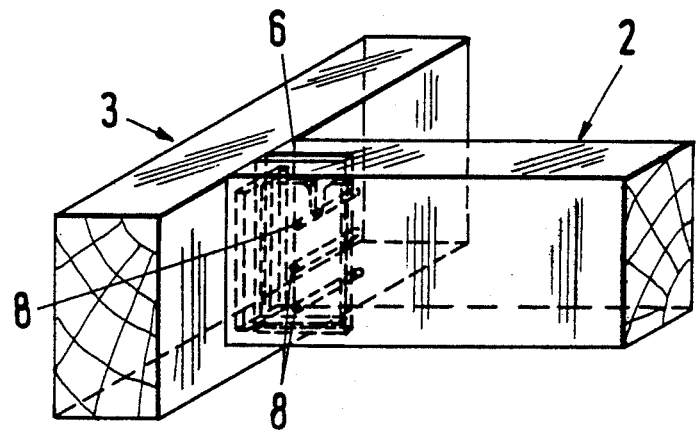
FIG. 9 shows the disposition as in FIG. 8, illustrated as in FIG. 3.
Figure 7:
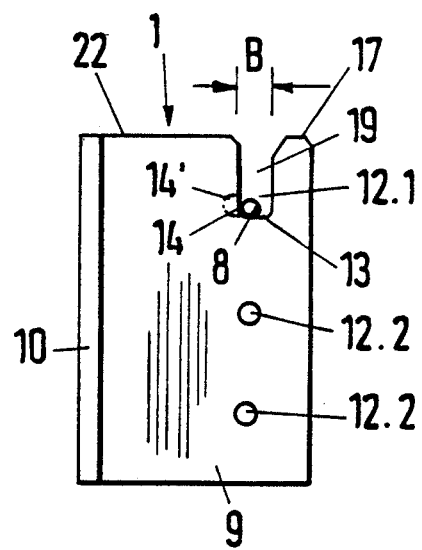
FIG. 7 shows a third exemplary embodiment of a joining element of the invention, illustrated as in FIG. 1.

FIGS. 7 to 9 show a further variation, which represents a "midway solution" between the joining element of FIGS. 1 to 3 on the one hand and the joining element of FIGS. 4 to 6 on the other hand. In this configuration too, as in the configuration per FIGS. 4 to 6, the joining element 1 presents two second receiving openings 12.2 and only one first receiving opening 12.1, although plainly here too one of the first two receiving openings 12.2 might be replaced by one first receiving opening 12.1 as in FIG. 4.

In comparison to the configuration of FIGS. 4 to 6—and just as with the configuration of FIGS. 1 to 3—one gets the considerable advantage during assembly that the top dowel pin 8 can be driven into the first beam 2 even before the first beam 2 is set up, so that in this regard the same advantages result during assembly as with the joining element 1 of FIGS. 1 to 3, and after assembly and under load, the same advantages result in regard to the dowel pin(s) disposed in the first receiving opening(s) 12.1 as have already been described in detail above in regard to first receiving openings 12.1, particularly if here too the left side wall 14 of the first receiving opening 12.1 has a recess in the direction toward the holding flange 10, so that the dowel pin 8 indicated in the assembled state in FIG. 7 is only engaged with the lower side wall 13 of the first receiving opening 12.1.

It should furthermore be pointed out that to achieve the lowest possible production costs, the recess 19 above the actual first receiving opening 12.1 is configured to be just as wide as the length of the first receiving opening 12.1 running in the longitudinal direction 5 of the first beam 2, so that no undercut is present; the width B of the recess 19 in this exemplary embodiment is approximately 2 mm greater than the diameter D of the dowel pin 8. If at the same time the connecting flange 9 is not milled but stamped, as is profitable in series production, then the expansion of the first receiving opening 12.1 to the right (i.e., in the direction of the arrow 5), as provided under the invention, can of course also be configured as an undercut without any considerable added cost, as is the case in the configuration of FIGS. 1 to 3.

Figure 11:
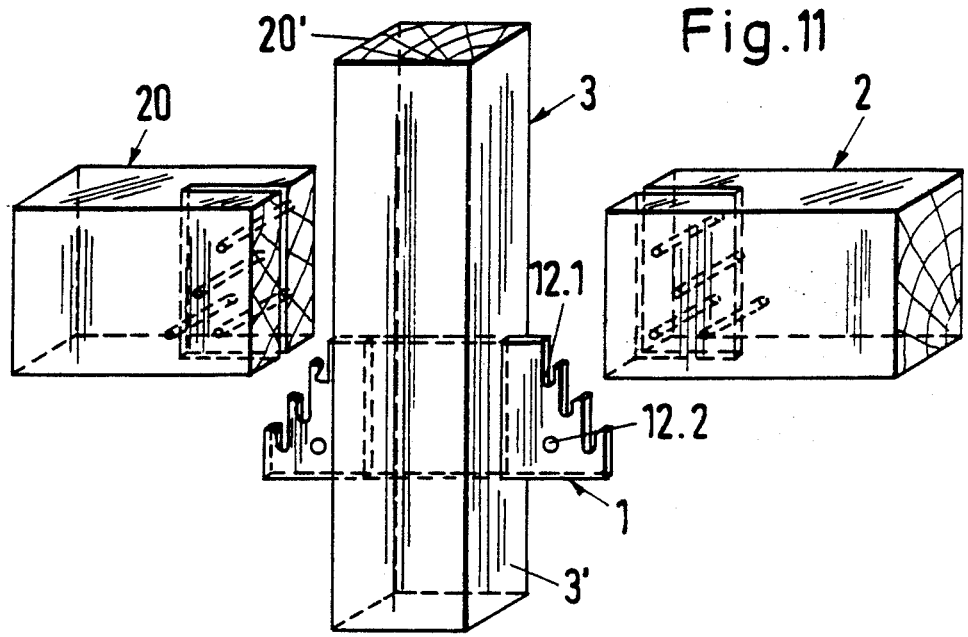
FIG. 11 shows a joining element as in FIG. 10 in its assembled state on the support column, with the girders to be connected on either side not yet assembled.
Figure 10:
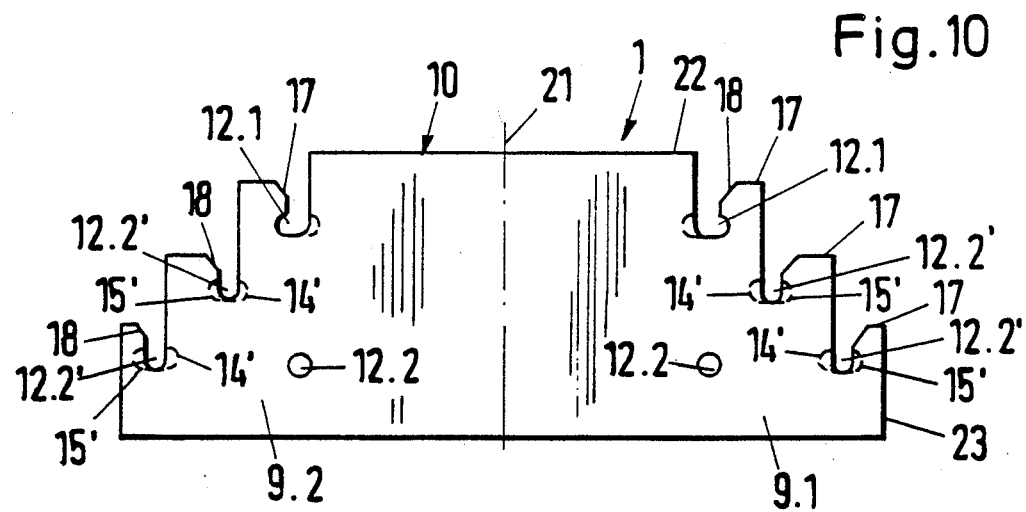
FIG. 10 shows a fourth exemplary embodiment of a joining element of the invention, illustrated as in FIG. 1, in which instance this joining element is intended for the connection of a horizontal girder to a vertical support column.

FIGS. 10 to 11 show a further variant of a joining element 1, with which a first beam 2 functioning as a girder is to be connected to a second beam 3 disposed to be disposed as a vertical support column, and in addition yet another, third beam 20 running flush with the first beam 2 is to be connected to the connecting surface of the support column 3 lying opposite the connecting surface 3'.

Figure 12:
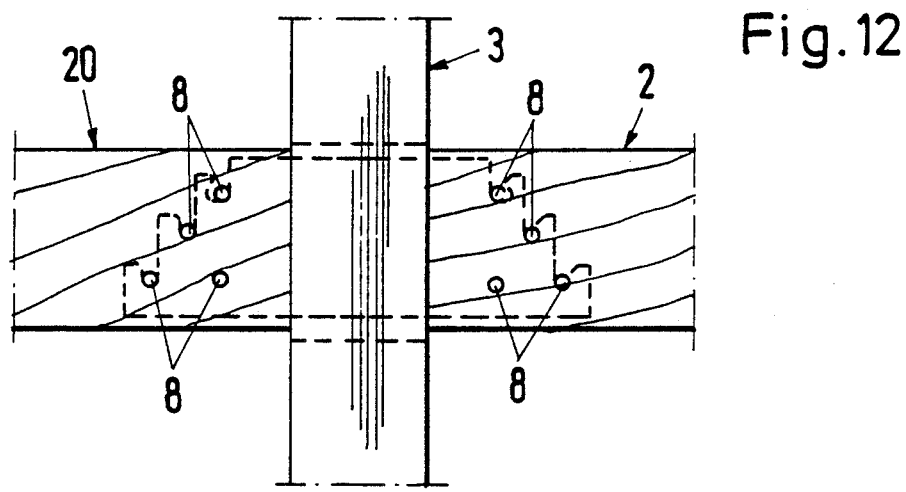
FIG. 12 shows a side view of the assembled disposition as in FIG. 11, in a lateral top view onto the two connected girders.

As can be seen from FIGS. 10 to 12, the joining element 1 is configured mirror-symmetric to its center line 21 running parallel to the second beam 3, while not only the two connecting flanges 9.1 and 9.2 are flush with one another, but so is the shared holding flange 10 lying between them, which in the assembled state is disposed in a through-slot in the second beam 3.

It can be seen that each of the two connecting flanges 9.1 and 9.2 in the embodiment shown in dotted lines in FIG. 10 presents one first receiving opening 12.1 and three second receiving openings 12.2, which however are obviously configured differently. Namely, while each of the second receiving openings 12.2 disposed in the inner, approximately central zone—just like the second receiving openings 12.2 of the configurations per FIGS. 1 to 9—is configured as a drill hole, the second receiving openings designated as 12.2' in FIG. 10 can readily be changed, if needed, into first receiving openings 12.1, by being expanded laterally on one or both sides b the undercuts 15' or/and 14' shown in dotted lines in FIG. 10, so that the dowel pins 8 disposed in them—just like the dowel pins 8 to be disposed in the first two receiving openings 12.1—can then receive only transverse forces, while the relative positioning or fastening of the first beam 2 or of the third beam 20 to the second beam 3 then ultimately again takes place (only) during assembly by way of the second receiving opening 12.2 and the dowel pin 8 to be driven into this opening.

It should furthermore be pointed out that for space frames in particular, it may be useful to provide the joining element with two (parallel) connecting flanges, which then as a rule are configured identically.

What is claimed is:

1. Joining element made of metal, to connect the end face of a first beam to a second beam running crosswise to this first beam, or to another structural component, wherein the first beam's end section, which is to be connected to the second beam, is provided with an essentially centered vertical slot running in the longitudinal direction of the first beam from its end face that is to be connected, and with several drill holes disposed crosswise to and in the vicinity of the slot, in each of which a rod-shaped fastening means extending essentially across the width of the first beam, such as a dowel pin or the like, is disposed or is to be disposed, with at least one connecting flange protruding from the connecting surface of the second beam in the longitudinal direction of the first beam and to be attached to the second beam with a holding flange, the dimensions of which connecting flange essentially match the corresponding dimensions of the slot, and which connecting flange is provided with receiving openings each of which is to accept one rod-shaped fastening means disposed in the first beam; characterized in that at least one first receiving opening (12.1) is dimensioned larger, at least in the longitudinal direction (5) of the first beam (2), than the cross-section, extending in this direction, of the rod-shaped fastening means (8) to be disposed in this first receiving opening (12.1), by so much that this fastening means is not engaged, either during/after assembly or when the first beam (2) is put under load, with at least one side wall (15 and/or 14) of the first receiving opening (12.1) running crosswise to the side wall (13) of the first receiving opening (12.1) that supports the rod-shaped fastening means (8).

2. Joining element as claimed under claim 1, characterized in that the at least one first receiving opening (12.1) is so configured and dimensioned that in the assembled state the rod-shaped fastening means (8) it accepts is engaged only on its underside with the lower side wall (13) of the first receiving opening (12.1).

3. Joining element as claimed under claim 2, characterized in that the at least one first receiving opening (12.1) is so configured and dimensioned that in the assembled state the rod-shaped fastening means (8) it accepts is additionally engaged—aside from with the lower side wall (13)—only with a side-wall section (14) of the first receiving opening (12.1) in the direction of the first beam's (2) end face (4) that is to be connected.

4. Joining element as claimed under claim 2, characterized in that the bearing surface (13) of the at least one first receiving opening (12.1), which surface runs crosswise to the vertical, is configured to be curved essentially in the shape of the deflection curve of the first beam (2) as results under load in the assembled state.

5. Joining element as claimed under claim 1, characterized in that a recess (19) extends essentially upward from the at least one first receiving opening (12.1), having a width at least as great as the cross-section of the rod-shaped joining element (8) as measured in the longitudinal direction (5) of the first beam (2).

6. Joining element as claimed under claim 5, characterized in that the recess (19) extends as far as the upper edge (22) of the connecting flange (9).

7. Joining element as claimed under claim 6, characterized in that the wall section (15) of at least one first receiving opening (12.1), facing away from the end face (4) to be connected, or of the recess adjacent thereto, is configured so as to be angled off or curved at least on one upper end section.

8. Joining element as claimed under claim 1, characterized in that several first receiving openings (12.1) are present.

9. Joining element as claimed under claim 8, characterized in that the first receiving openings (12.1) are disposed offset from one another in the longitudinal direction (5) of the first beam (2).

10. Joining element as claimed under claim 8, characterized in that two first receiving openings (12.1) are provided.

11. Joining element as claimed under claim 8, characterized in that the section of the connecting flange (9) lying between two mutually adjacent first receiving openings (12.1) or between the free edge (23) of the connecting flange (9) and the first receiving opening (12.1) adjacent to this edge, ends below the upper edge line (22) of the connecting flange (9).

12. Joining element as claimed under claim 1, characterized in that disposed at a distance from the at least one first receiving opening (12.1) at least one second receiving opening (12.2) is provided, which presents a cross section matching the cross section of the rod-shaped joining element (8) associated with this receiving opening (12.2).

13. Joining element as claimed under one claim 1, characterized in that the holding flange (10) is configured, in a manner known per se, in a single piece with the connecting flange (9).

14. Joining element as claimed under claim 13, characterized in that the holding flange (10) extends, in a manner known per se, at a right angle to the connecting flange (9).

15. Joining element as claimed under claim 13, characterized in that the holding flange (10), in a manner known per se, is flush with the connecting flange (9).

16. Joining element as claimed under claim 15, characterized in that the holding flange (10) extends through the second beam (3) and presents on its end facing away from a first connecting flange (9.1) a second connecting flange (9.2) to connect a third beam (2)) flush with the first beam (2), which is configured mirror-symmetric with the first connecting flange (9.1).

17. Joining element as claimed under claim 2, characterized in that the at least one first receiving opening (12.1) is configured and dimensioned in such a way that the distance between a rod-shaped fastening means (8) disposed in a first receiving opening (12.1) and a sidewall section (15 or/and 14') of the first receiving opening (12.1), specified to be contact-free, is at least about 2 mm in the assembled state of the first beam (2).

* * * * *